(12) United States Patent
Fraas et al.

(10) Patent No.: US 7,031,300 B1
(45) Date of Patent: Apr. 18, 2006

(54) METHOD FOR IDENTIFYING A TRANSFER UNIT WHICH IS PART OF A CONNECTION BETWEEN A COMMUNICATIONS TERMINAL AND A PRIVATE BRANCH EXCHANGE

(75) Inventors: Wolfgang Fraas, Wolfratshausen (DE); Klaus Huenlich, Neuching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/787,730

(22) PCT Filed: Sep. 13, 1999

(86) PCT No.: PCT/DE99/02889

§ 371 (c)(1),
(2), (4) Date: Mar. 21, 2001

(87) PCT Pub. No.: WO00/17945

PCT Pub. Date: Mar. 30, 2000

(30) Foreign Application Priority Data

Sep. 23, 1998 (DE) ................................ 198 43 625

(51) Int. Cl.
*H04L 12/66* (2006.01)
(52) U.S. Cl. .................. 370/352; 370/395.61; 370/474
(58) Field of Classification Search ................ 370/474, 370/465, 466, 471, 395.61, 395.6, 410, 395.64, 370/395.1, 475, 352
See application file for complete search history.

(56) References Cited

U.S. PATENT DOCUMENTS

| | | | | |
|---|---|---|---|---|
| 5,619,500 A | * | 4/1997 | Hiekali | 370/414 |
| 6,021,134 A | * | 2/2000 | Hiraiwa et al. | 370/474 |
| 6,160,817 A | * | 12/2000 | Wille et al. | 370/467 |
| 6,195,714 B1 | * | 2/2001 | Li et al. | 710/31 |
| 6,252,870 B1 | * | 6/2001 | Fraas et al. | 370/353 |
| 6,272,128 B1 | * | 8/2001 | Pierson, Jr. | 370/352 |
| 6,584,094 B1 | * | 6/2003 | Maroulis et al. | 370/352 |

FOREIGN PATENT DOCUMENTS

| | | |
|---|---|---|
| DE | 195 05 271 | 1/1996 |
| DE | 196 04 244 | 8/1997 |
| EP | 0 822 731 | 2/1998 |
| WO | 98/38830 | 9/1998 |

OTHER PUBLICATIONS

"Digital Sections and Digital Line Systems—Access Digital Section for ISDN Basic Rate Access"; ITU-T Recommendations G.960; Mar. 1993.
SIEMENS, AG—ICs For Communications: IOM-2 Interface Refernece Guide; Edition 3.91.
SIEMENS, AG—ISDN Oriented Modular (IOM) Architecture—Second Generation ISDN Ics, IOM-2 Interface; Ics for Communications; I Jan. 1989; p. 68.

* cited by examiner

*Primary Examiner*—Ricky Q. Ngo
*Assistant Examiner*—Nittaya Juntima
(74) *Attorney, Agent, or Firm*—Staas & Halsey LLP

(57) ABSTRACT

Communication terminals are connected to a communication network via at least one hub having an unambiguous address in the communication network. Data transmission between the switching system and the communication terminals is provided using a time-slot-oriented data format formed from a periodic sequence of channel-oriented information segments. The address of the hub is transmitted from the hub to the switching system in an agreed information segment.

13 Claims, 4 Drawing Sheets

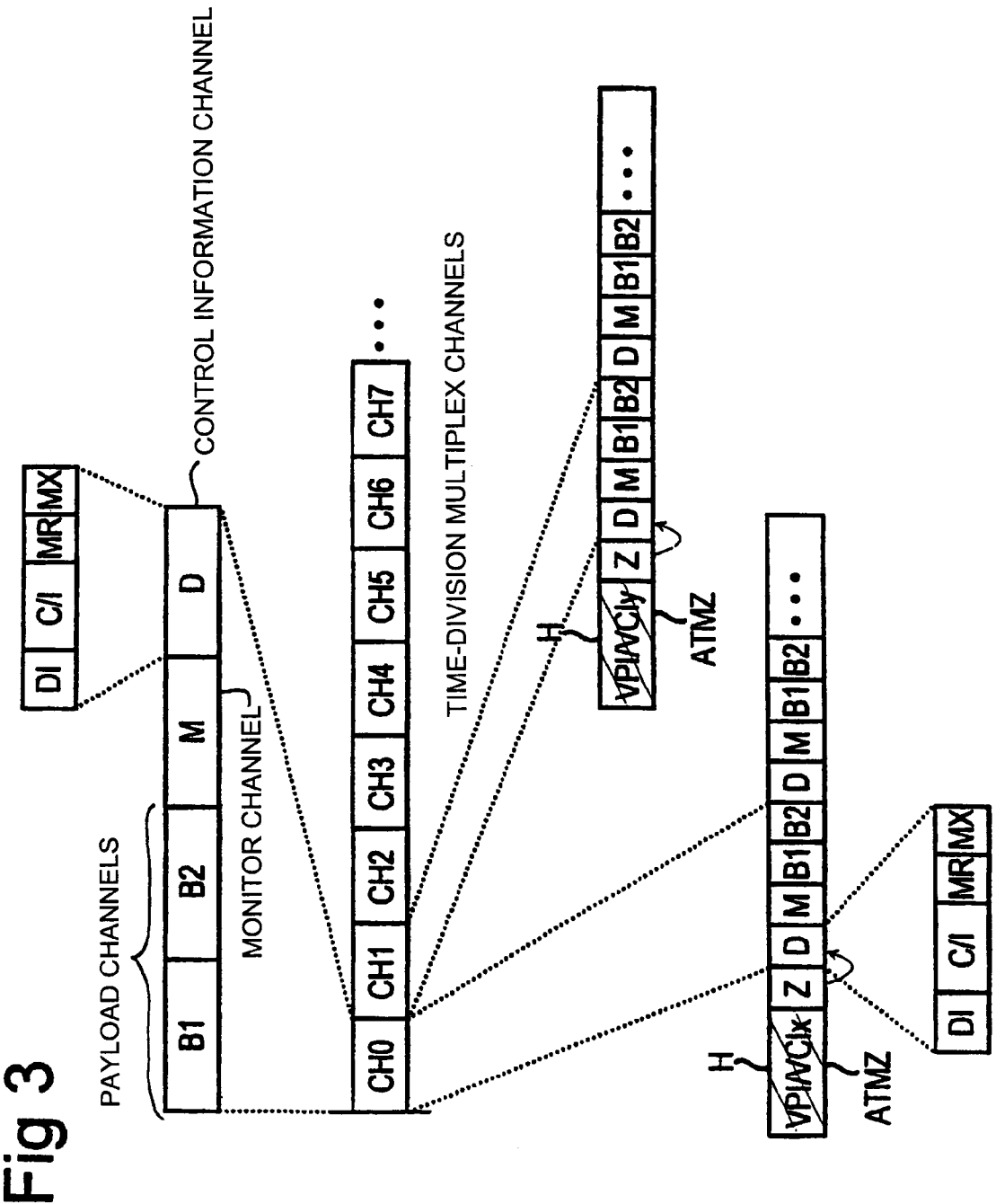

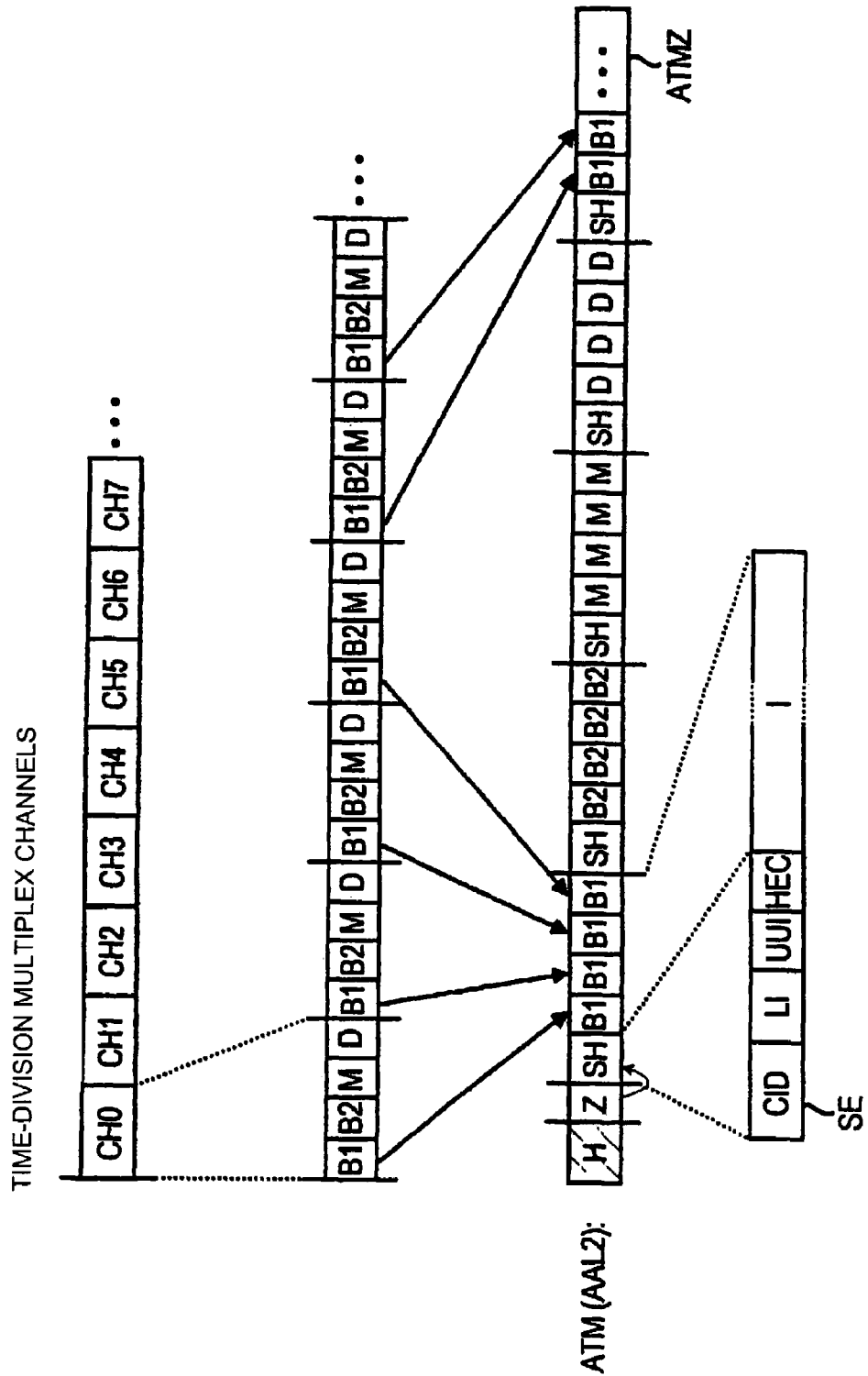

METHOD FOR IDENTIFYING A TRANSFER UNIT WHICH IS PART OF A CONNECTION BETWEEN A COMMUNICATIONS TERMINAL AND A PRIVATE BRANCH EXCHANGE

BACKGROUND OF THE INVENTION

1. Field of the Invention

The present invention pertains to data transmission systems generally, and in particular to transmission systems for time-slot-oriented data.

2. Discussion of the Related Art

A transmission system for transmitting time-slot-oriented data between an exchange termination and a line termination is usually part of a communication system having a switching facility and subscriber line facilities. The subscriber line facilities have subscriber interfaces for connecting communication terminals to the communication system.

According to the ITU-T G.960 Standard, the subscriber line facilities are connected to the switching facility of the communication system via a line termination and an exchange termination. Such a communication system is used for setting up and, respectively, clearing down narrow-band communication connections between communication terminals connected to the subscriber line facilities and to provide for narrow-band communication—for example voice or data communication—between the communication terminals.

In modern communication systems, data transmission between the exchange termination and the line termination usually takes place on the basis of the time-slot-oriented data format IOM-2 (ISDN Oriented Modular Interface) formed from a periodic sequence of channel-individual information segments—called time-division multiplex channel in the text which follows. As a rule, one time-division multiplex channel is in each case allocated to each subscriber interface of a subscriber line facility in this arrangement.

In modern communication engineering, there is a need for broadband transmission of information such as, for example, still and moving pictures in videophone applications or of large volumes of data in the Internet. This increases the significance of transmission techniques for high and variable data transmission rates (greater than 100 Mbit/s) which take into account both the requirements of the data transmission (high speed at variable transmission bit rate) and the requirements of voice data transmission (maintaining time correlations with a data transmission via a network) so that the separate networks currently existing for the various purposes can be integrated in one network. A known data transmission method for high data speeds is the so-called Asynchronous Transfer Mode (ATM). Data transmission on the basis of the Asynchronous Transfer Mode currently enables a variable transmission bit rate of up to 622 Mbit/s to be obtained.

In the cell-based data transmission method known as Asynchronous Transfer Mode (ATM), so-called ATM cells are used for transporting fixed-length data packets. An ATM cell is composed of a so-called "header" with a length of five bytes which contains switching data relevant to the transportation of an ATM cell, and a so-called "payload" with a length of 48 bytes.

Data transmission via an ATM-based network generally takes place in so-called virtual paths or virtual channels. For this purpose, interconnection tables with switching information consisting of a virtual channel identifier and of a virtual path identifier are set up in the respective ATM network nodes of the ATM-based network by an exchange of signaling information during a connection set-up before the beginning of the actual user data transmission. In the interconnection tables, a so-called VCI value is assigned to the virtual channel identifier and a so-called VPI value is assigned to the virtual path identifier.

The switching information entered in the interconnection table of an ATM network node establishes how the virtual paths or, respectively, virtual channels contained in the virtual paths of the incoming and outgoing connections at the ATM network node are correlated with one another by the signaling, that is to say which input is connected to which output by a switching. ATM cells transmitted via these virtual connections (virtual paths and virtual channels) have switching data essentially consisting of a VPI value and a VCI value in the header. The ATM header data are processed, i.e. the switching data arranged therein are detected and evaluated at the input of an ATM network node. The ATM cells are then switched through by the ATM network node to an output of the ATM network node representing a certain destination by means of the switching information stored in the interconnection table.

German Offenlegungsschrift DE 196 04 244 A1, shows a transmission system between an exchange termination and a line termination in which transmission is implemented via an ATM-based network. In this arrangement, subscriber interfaces for connecting ISDN (Integrated Services Digital Network) oriented communication terminals by ATM hubs connected to the ATM-based network are provided. The exchange termination of the communication system and the line termination implemented by the ATM hub have an ATM interface unit via which, on the one hand, a connection to the ATM-based network is implemented and, on the other hand, the IOM-2 data format usually provided for a data transmission between the exchange termination and the line termination is converted to the ATM-based data format. Or, the ATM-based data format is converted to the IOM-2 data format.

For addressing a subscriber interface of the ATM hub via the ATM-based network, a permanently set up ATM channel of the ATM-based network is allocated to each time-division multiplex channel of the IOM-2 data format, i.e. an unambiguous VPI/VCI address is allocated to each subscriber interface of an ATM hub for a data transmission via the ATM-based network. The VPI-VCI addresses are allocated to the respective subscriber interfaces and managed manually in the switching system.

If a fault occurs at a subscriber interface or at a communication terminal connected to the subscriber interface, only the VPI/VCI address of the defective subscriber interface or of the communication terminal connected to the subscriber interface is known in the switching system. It is not possible to find the ATM hub associated with the communication terminal.

A method for finding the association of a communication terminal with a subscriber interface of an ATM hub which is already used is the tracing back of the path in the ATM-based network starting from the switching system to the communication terminal, i.e. determining the path in the ATM-based network by means of the switching information stored in the ATM network nodes. In most cases, however, this is not possible since the operator of the ATM-based network is not, as a rule, the operator of the telecommunication network implemented on this. The switching information stored in the ATM network nodes is thus not available to the operator of the telecommunication network.

Thus, according to the terminology of the ITU-T G.960 Standard (3/93) "access digital section for ISDN basic rate access", especially pages 2 and 3, the present invention is based on data transmission occurring at the V reference point.

SUMMARY OF THE INVENTION

It is an object of the present invention to provide a method for determining the ATM hub associated with a communication terminal in a simple manner.

It is another object of the invention to provide a method that can easily be implemented without making changes at the interface between switching system and ATM hub.

It is an additional object of the invention to provide a method wherein the susceptibility to faults is reduced by an automatic detection of the association between a communication terminal and an ATM hub.

It is a further object of the invention to provide a method wherein existing free transmission capacities are utilized by way of a monitor channel for transmitting the address of an ATM hub to a switching system.

These and other objects of the invention will become apparent from a review of the following detailed description of the preferred embodiment, which is to be read in conjunction with a review of the accompanying drawing figures.

BRIEF DESCRIPTION OF THE DRAWINGS

FIG. 3 shows a diagrammatic representation of a conversion of a time-slot-oriented data format into an ATM data format according to the present invention; and FIG. 4 shows a diagrammatic representation of a conversion of another time-slot-oriented data format into an ATM data format according to the present invention.

DETAILED DESCRIPTION OF THE REFERRED EMBODIMENTS

To obtain a better understanding of the operation of a transmission of time-slot-oriented data between an exchange termination and a line termination, here is a discussion of basic principles.

Time-slot-oriented data are usually transmitted between an exchange termination and a line termination on the basis of a known data format. An example of which is IOM-2 described in the product document "ICs for Communications—IOM®-2 Interface Reference Guide" by Siemens, Munich, 3/91, order No. B115-H6397-X-X-7600, particularly pages 6 to 12.

Figure 1:
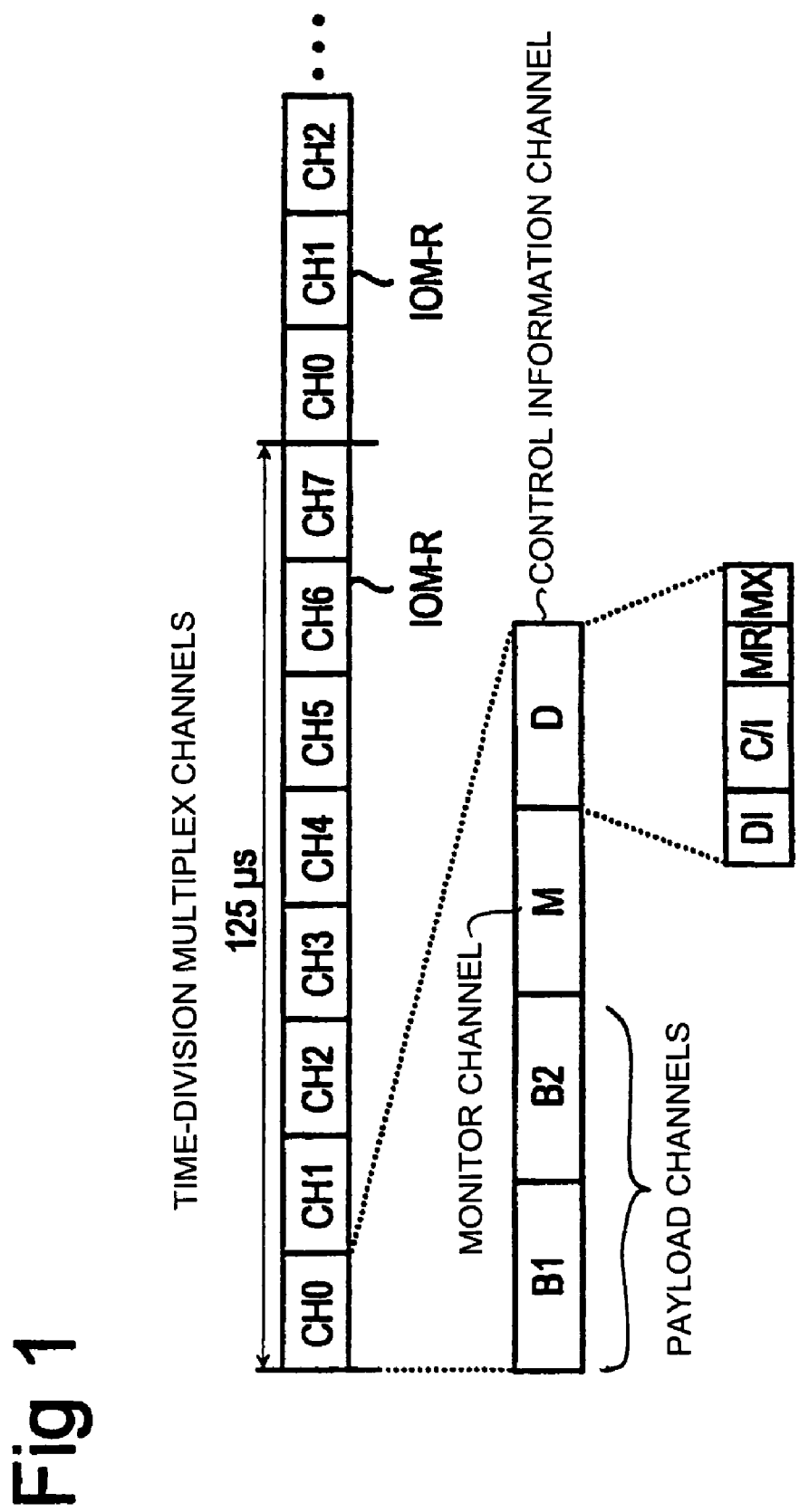
FIG. 1 shows a diagrammatic representation of an IOM-2 data format.

FIG. 1 shows a diagrammatic representation of the IOM-2 data format wherein time division multiplex frames IOM-R having a length of 125 µs are periodically transmitted. Such a time-division multiplex frame IOM-R is divided into time-division multiplex channels or subframes CH0–CH7, which are frequently simply called 'channels' in the literature.

The subframes CH0–CH7, in turn, are subdivided into two 8-bit-long payload channels B1, B2, into an 8-bit-long monitor channel M, into a 2-bit-long control information channel DI, into a 4-bit-long status channels C/I (Command/Indicate), and into two monitor status channels MR, MX which in each case have a length of 1 bit. The control information channel DI, the status channel C/I and the two monitor status channels MR, MX are usually combined and referred to as a control information channel D. Channel D is sometimes referred to as signaling channel D.

Via the user data channels B1, B2, user data are transmitted between facilities connected to an IOM-2 bus with a transmission bit rate of 64 kbit/s in each case. Via the control information channel D, control information associated with the user data are transmitted at a transmission bit rate of 16 kbit/s. The monitor channel is used, among other things, for configuring facilities connected to an IOM-2 bus on the basis of a so-called 'IOM-2 bus master'. Via the monitor status channels MR (Monitor Read) and MX (Monitor Transmit) it is established whether data from a facility connected to the IOM-2 bus are read from the IOM-2 bus (MR=1, MX=0) or are output to the IOM-2 bus (MR=0, MX=1). Via the status channel C/I, information on real-time requirements existing for a data transmission between two facilities connected to the IOM-2 bus are exchanged.

Figure 2:
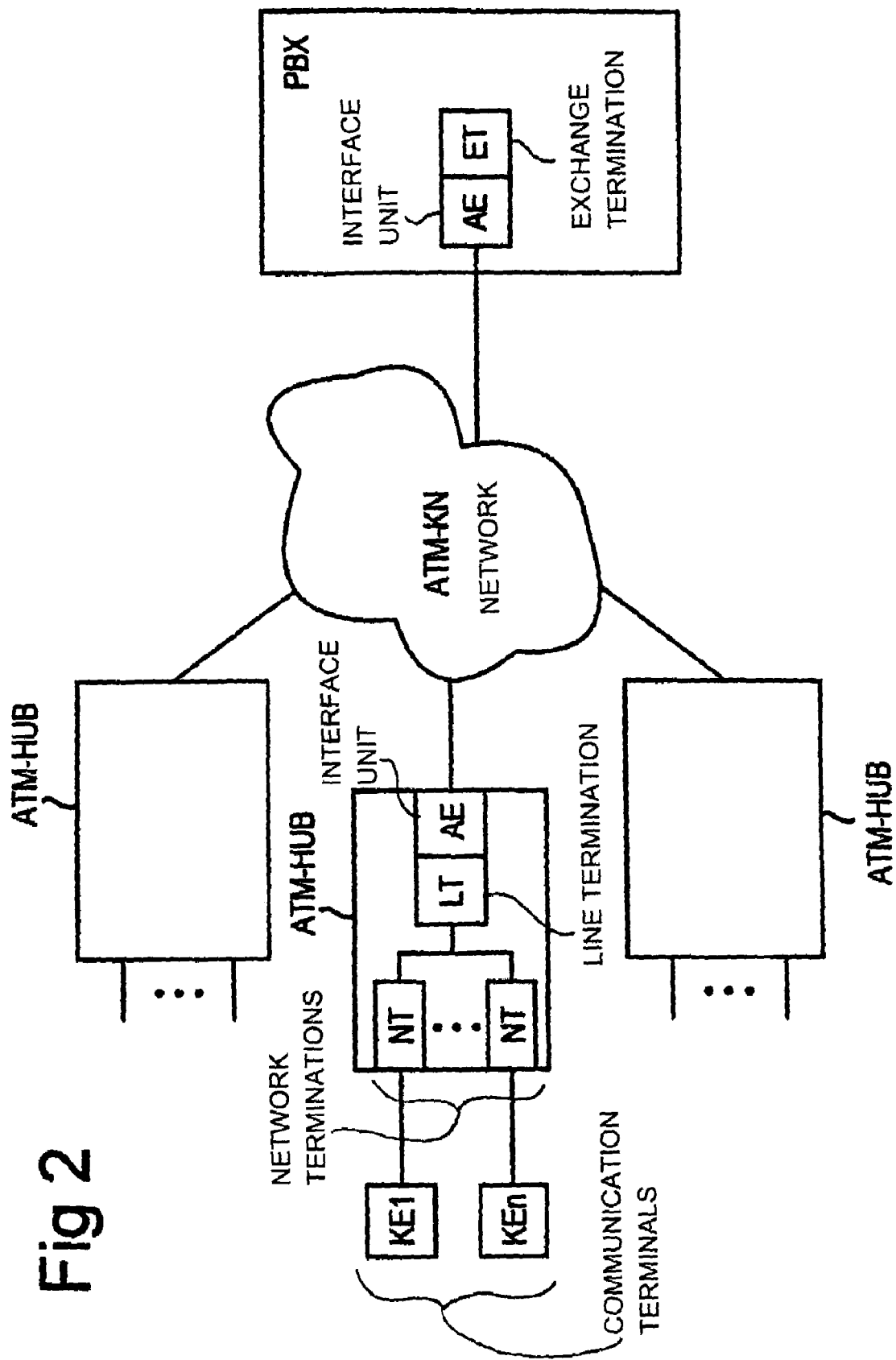
FIG. 2 shows a diagrammatic representation of essential functional units according to the present invention.

FIG. 2 shows a diagrammatic representation of a PBX (Private Branch Exchange) switching system with an exchange termination (ET) arranged therein. The exchange termination ET is connected to an ATM-based communication network ATM-KN via an interface unit AE.

Furthermore, ATM hubs ATM-HUB, which have subscriber interfaces for connecting communication terminals to the ATM-based communication network ATM-KN, are connected to the ATM-based communication network ATM-KN. Communication terminals are shown by way of example.

ISDN (Integrated Services Digital Network) communication terminals are usually connected to the ATM-based communication network ATM-KN by means of $S_0$ interfaces. Or, digital communication terminals are usually connected to the ATM-based communication network ATM-KN by means of interfaces derived therefrom, such as for example, $U_{p0}$ interfaces, via an ATM hub. In general, a $U_{p0}$ or an $S_0$ interface comprises, on the one hand, two user data channels which are equipped with a transmission rate of 64 kbit/s in each case as ISDN-oriented B channels, and on the other hand, a signaling channel configured as an ISDN-oriented D channel with a transmission rate of 16 kbit/s. Furthermore, it is generally possible to connect analog communication terminals to the ATM-based communication network ATM-KN via a/b interfaces.

Communication terminals are connected to the ATM hub ATM-HUB. Thus, the subscriber interfaces are provided by the ATM hub ATM-HUB by network terminations NT according to the terminology of the ITU-T G.960 Standard. Based upon the ITU-T G.960 Standard, the network terminations of an ATM hub ATM-HUB are connected to the exchange termination ET of the switching system PBX via a line termination LT arranged in the ATM hub ATM-HUB. For a data transmission via the ATM-based communication network ATM-KN, the line termination LT, corresponding to the exchange termination ET of the switching system PBX, is connected to the ATM-based communication network ATM-KN via an interface unit AE.

Interface units AE provide a bi-directional conversion between the time-slot-oriented IOM-2 data format usually provided for a data transmission between the exchange termination and the line termination, and the packet-oriented ATM data format according to two different conversion modes, which will be explained in greater detail below.

FIG. 3 shows a diagrammatic representation of the conversion of the IOM-2 data format into the ATM data format according to the first conversion mode. In this mode, time-slot-oriented data are packed byte by byte into ATM cells according to the first ATM adaptation layer AAL1 on the basis of the CES 2.0 rule of the ATM Forum. The ATM adaptation layer AAL is used for adopting the ATM cell format to the network layer (Layer 3) of the OSI (Open System Interconnection) Reference Model.

In a conversion of the time-slot-oriented data format to the packet-oriented ATM data format, each subframe CHx is allocated an unambiguous VPI/VCI address for transmission via the ATM-based communication network ATM-KN. Thus, data allocated to different subframes CHx, are transmitted in separate ATM cells ATMZ having an unambiguous VPI/VCI address stored in the header H of the ATM cell ATMZ, which is shown by way of example with the VPI/VCI address VPI/VCIx for subframe CH0 and with VPI/VCI address VPI/VCIy for subframe CH1.

In addition to the header H of the ATM cell ATMZ, the first byte in the payload area is defined as pointer Z. This pointer Z points to the first byte of the data allocated to a subframe CHx within the payload area of an ATM cell ATMZ. This pointer Z provides the possibility of restoring synchronization between transmitter and receiver in the case where one or more ATM cells ATMZ have been lost, such as due to a transmission fault.

The first ATM adaptation layer AAL1, in a byte-by-byte manner, converts all 4 channels following one another in time in a subframe CHx, to the ATM cell format according to the ECMA Standard 277 (Standardizing Information and Communication Systems), including the two payload channels B1, B2, the monitor channel M and the control channel D.

Payload information is transmitted beginning with the second byte of the payload area of an ATM cell ATMZ. The data allocated to the individual channels of a subframe CHx, shown by way of example for subframes CH0, CH1 in the figure, are transmitted in succession beginning with the data of the control channel D, followed by the data of the monitor channel M, the data of the first payload channel B1 and the data of the second payload channel B2.

Following insertion of the data of the second payload channel B2 into the payload area of an ATM cell ATMZ, the data of the control channel D of the corresponding following subframe CHx, shown by way of example for subframes CH0, CH1 in the figure, are read in.

Bytes arranged in the payload area of an ATM cell ATMZ are thus allocated to a channel, to the first payload channel B1, to the second payload channel B2, to the monitor channel M and to the control channel D, of a subframe CHx via the position of the byte in the payload area of the ATM cell ATMZ.

FIG. 4 shows the conversion of the IOM-2 data format into the ATM data format according to the second conversion mode in a diagrammatic representation. In this mode time-slot-oriented data are packed byte by byte into ATM cells ATMZ according to the second ATM adaptation layer AAL2. In the second ATM adaptation layer AAL2, it is possible to subdivide the payload area of an ATM cell ATMZ into so-called substructure elements SE.

A substructure element SE according to the second ATM adaptation layer AAL2 is composed of a 3-byte-long header SH and a payload area I of variable length (0 to 64 bytes). The header SH of a substructure element SE according to the second ATM adaptation layer AAL2 is in turn subdivided into an 8-bit-long channel identifier CID, a 6-bit-long length indicator LI, a 5-bit-long user-to-user indication UUI, and a 5-bit-long header error control HEC.

Subdividing an ATM cell ATMZ into substructural elements SE makes it possible to define a number of channels by means of the channel identifier CID in an ATM connection, all of which channels are addressed with the same ATM address consisting of a VPI value and a VCI value.

During a data transmission between the switching system PBX and an ATM hub ATM-HUB, particularly in exchange termination ET and line termination LT, it is thus possible to define substructural elements SE for the transmission of channel-oriented data of a subframe CHx.

In addition to the header H of the ATM cell ATMZ, the first byte in the payload area is defined as pointer Z. This pointer Z points to the first byte of a substructural element SE arranged in the payload area of an ATM cell ATMZ. This pointer Z can be used for restoring synchronization between transmitter and receiver in the case where one or more ATM cells ATMZ have been lost, such as due to a transmission fault.

In the present embodiment, an individual substructural element SE is defined for the first payload channel B1, the second payload channel B2, the monitor channel M, and the control channel D, and is then transmitted in the payload area of the ATM cell ATMZ. By way of example, a payload area I of the substructural element SE with a length of 4 bytes is shown in FIG. 4. Following the substructural element SE allocated to the control channel D, the substructural element SE allocated to the first payload channel B1 of the corresponding subframe CHx is transmitted in the payload area of an ATM cell ATMZ.

In the case of an ATM cell ATMZ according to the second ATM adaptation layer AAL2, in contrast to an ATM cell ATMZ according to the first ATM adaptation layer AAL1, a payload byte is allocated to a channel, to the first payload channel B1, to the second payload channel B2, to the monitor channel M and to the control channel D, of a subframe CHx not via the position of the payload byte in the payload area of the ATM cell ATMZ but via the channel identifier CID.

For addressing a communication terminal KE1-KEn connected to an ATM hub ATM-HUB, only the VPI/VCI address allocated to the communication terminal KE1-KEn in the ATM-based communication network ATM-KN is known in the switching system PBX. Thus, it is not possible, for the reasons known in the introduction to the description, to locate the terminal KE1-KEn in the ATM-based communication network ATM-KN, i.e. to associate it with an ATM hub ATM-HUB.

According to the present invention, an unambiguous address is allocated to each ATM hub ATM-HUB and, if necessary, each ATM network node in the ATM-based communication network ATM-KN for locating a communication terminal KE1-KEn. This address is stored in a non-volatile memory of the ATM hub ATM-HUB and can be retrieved on request. If, for example, a fault is reported to the switching system PBX, or if it is necessary for any other reason to determine the association of a communication terminal KE1-KEn with an ATM hub, the switching system PBX transmits a corresponding request message by means of the VPI/VCI address of the communication terminal KE1-KEn stored in the switching system PBX.

For such a request message, the bits transmitted in the monitor status channels MR, MX are both set to the value 1 (MR=1, MX=1) or alternatively to the value 0 (MR=0, MX=0). Furthermore, it is possible to establish a special protocol by means of which a message transmitted by the switching system PBX to a communication terminal KE1-KEn is identified as a request message. This protocol can then be transmitted via the control information channel D or the monitor channel M from the switching system PBX to the ATM hub ATM-HUB associated with the corresponding communication terminal KE1-KEn.

If an ATM hub ATM-HUB receives such a request message (MR=1, MX=1 or MR=0, MX=0), the ATM hub ATM-HUB transmits the address allocated to it in the ATM-based communication network ATM-KN via the monitor channel M according to the IOM-2 data format. The switching system PBX can associate the wanted communication terminal KE1-KEn with an ATM hub ATM-HUB by means of the address transmitted via the monitor channel M.

The address of the ATM hub ATM-HUB is advantageously octet-oriented, i.e. the length of the address is a multiple m (m=1, 2, 3, . . . ) of one byte. This provides for simple transmission of the address via the monitor channel M since the latter has a bandwidth of one byte per time-division multiplex frame IOMR.

Although modifications and changes may be suggested by those skilled in the art to which this invention pertains, it is the intention of the inventors to embody within the patent warranted hereon, all changes and modifications that may reasonably and properly come under the scope of their contribution to the art.

What is claimed is:

1. A method for identifying a hub in a communication network having a plurality of hubs connecting communication terminals to a switching system and using a time-slot-oriented data format formed from a periodic sequence of channel-oriented information segments for data transmission between the communication terminals via the hubs and the switching system, said method comprising:
    associating each of the hubs with an unambiguous address in the communication network;
    requesting the address of a respective hub by the switching system via a request message addressed to one of the communication terminals connected to the respective hub; and
    transmitting by the respective hub the address of the respective hub via the communication network to the switching system in an agreed information segment upon the request.

2. The method of claim 1, wherein the request is made during a message transmission from the switching system to the communication terminal.

3. The method of claim 1, wherein the request is made during a message transmission from the communication terminal to the switching system.

4. The method of claim 3, wherein the address is transmitted in a monitor channel transmitting configuration information of the time-slot-oriented data format.

5. The method of claim 4, further comprising the step of:
    indicating the request by transmitting an agreed bit combination in a signaling channel of the time-slot-oriented data format.

6. The method of claim 4, further comprising the step of: indicating the request by a simplified protocol being transmitted in the signaling channel or a monitor channel, which transmits configuration information concerning the time-slot-oriented data format.

7. The method of claim 6, wherein the time-slot-oriented data format is a standardized Integrated Services Digital Network Oriented Modular Interface data format.

8. The method of claim 7, further comprising the step of: indicating the request by bits transmitted via monitor status channels of the Integrated Services Digital Network Oriented Modular Interface data format to the hub being identical.

9. The method of claim 8, wherein the address length is one of, one byte and an integral multiple thereof.

10. The method of claim 9, wherein a data transmission via the communication network takes place on the basis of the ATM data format.

11. The method of claim 10, wherein a bi-directional conversion is made between the time-slot-oriented data format and the ATM data format for transmitting data via the communication network by the switching system and the hub.

12. The method of claim 11, wherein the bi-directional conversion between the time-slot-oriented data format and the ATM data format takes place in accordance with a first ATM adaptation layer AAL-Type 1.

13. The method of claim 12, wherein the bi-directional conversion between the time-slot-oriented data format and the ATM data format takes place in accordance with a second ATM adaptation layer AAL-Type 2.

* * * * *